US010917717B2

(12) United States Patent
Matheja et al.

(10) Patent No.: US 10,917,717 B2
(45) Date of Patent: Feb. 9, 2021

(54) MULTI-CHANNEL MICROPHONE SIGNAL GAIN EQUALIZATION BASED ON EVALUATION OF CROSS TALK COMPONENTS

(71) Applicant: NUANCE COMMUNICATIONS, INC., Burlington, MA (US)

(72) Inventors: Timo Matheja, Ulm (DE); Markus Buck, Biberach (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 16/426,402

(22) Filed: May 30, 2019

(65) Prior Publication Data
US 2020/0382863 A1 Dec. 3, 2020

(51) Int. Cl.
*H04R 3/00* (2006.01)
*H04R 1/40* (2006.01)
*G10L 25/78* (2013.01)
*H04R 29/00* (2006.01)

(52) U.S. Cl.
CPC .............. *H04R 3/005* (2013.01); *G10L 25/78* (2013.01); *H04R 1/406* (2013.01); *H04R 29/005* (2013.01); *H04R 2430/01* (2013.01)

(58) Field of Classification Search
CPC ...... H04R 3/005; H04R 1/406; H04R 29/005; H04R 2430/01; G10L 25/78
USPC ........................................................ 700/94
See application file for complete search history.

(56) References Cited

U.S. PATENT DOCUMENTS

| 8,068,406 | B2 | 11/2011 | Kim et al. |
| 8,392,180 | B1 | 3/2013 | Lachapelle et al. |
| 9,767,826 | B2 | 9/2017 | Matheja et al. |
| 10,110,997 | B2 | 10/2018 | Every |

(Continued)

OTHER PUBLICATIONS

Matheja et al.; "A dynamic multi-channel speech enhancement system for distributed microphones in a car", EURASIP Journal on Advances in Signal Processing 2013, 2013:191, pp. 1-21.

(Continued)

*Primary Examiner* — Vivian C Chin
*Assistant Examiner* — Douglas J Suthers
(74) *Attorney, Agent, or Firm* — Brian J. Colandreo; Michael T. Abramson; Holland & Knight LLP

(57) ABSTRACT

Gain mismatch and related problems can be solved by a system and method that applies an automatic microphone signal gain equalization without any direct absolute reference or calibration phase. The system and method performs the steps of receiving, by a computing device, a speech signal from a speaking person via a plurality of microphones, determining a speech signal component in the time-frequency domain for each microphone of the plurality of microphones, calculating an instantaneous cross-talk coupling matrix based on the speech signal components across the microphones, estimating gain factors based on calculated cross-talk couplings and a given expected cross-talk attenuation, limiting the gain factors to appropriate maximum and minimum values, and applying the gain factors to the speech signal used in the control path to control further speech enhancement algorithms or used in the signal path for direct influence on the speech enhanced audio output signal.

21 Claims, 5 Drawing Sheets

(56) References Cited

U.S. PATENT DOCUMENTS

2013/0179163 A1\* 7/2013 Herbig .................. H04R 27/00
                                                        704/233
2017/0251304 A1   8/2017 Herbig et al.

OTHER PUBLICATIONS

International Search Report dated Aug. 6, 2020 from corresponding International Patent Application No. PCT/US2020/032517, 2 pages.
Written Opinion dated Aug. 6, 2020 from corresponding International Patent Application No. PCT/US2020/032517, 5 pages.

\* cited by examiner

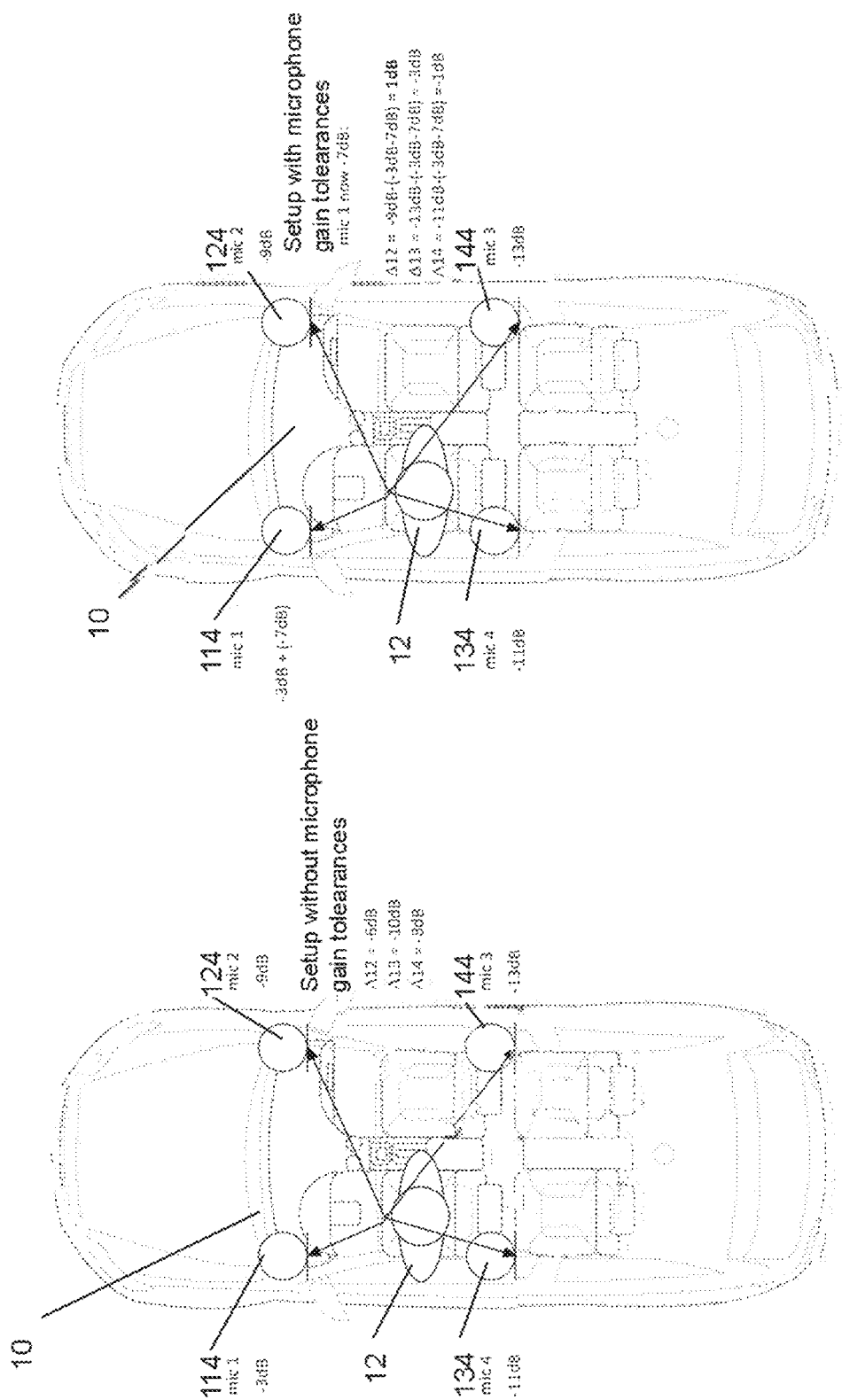

MULTI-CHANNEL MICROPHONE SIGNAL GAIN EQUALIZATION BASED ON EVALUATION OF CROSS TALK COMPONENTS

BACKGROUND OF THE DISCLOSURE

1. Field of the Disclosure

The present disclosure relates to multi-microphone systems used to capture speech sound from multiple persons. More particularly, the present disclosure relates to a system and method for automatic signal gain equalization based on evaluation of acoustic cross-talk components in such multi-microphone systems.

2. Description of the Related Art

Modern vehicles are equipped with multi-microphone systems and telephone connectivity to allow passengers to take advantage of voice-activated car features or engage in hands-free telephone conversations. In systems where each person speaking (hereinafter: "speaker") has a dedicated microphone close to the respective person's position, microphone gain tolerances often can have negative impact on speech signal enhancement (SE) or speaker zone detection processing. Typically, an absolute gain reference must be given, and the speech signal must be amplified or attenuated. Moreover, current SE does not sufficiently consider microphone gain mismatch. Microphone gain mismatch related to the effective gain of a microphone is caused, e.g., by fabrication tolerances. Due to such a mismatch, the same acoustic signal can produce different gain in a first microphone compared to a second microphone. In case microphone gain tolerances are present, power based methods such as the evaluation of the power ratio across the microphones are disturbed, and drawing conclusion about the room acoustics and the position of the active persons speaking is unreliable.

SUMMARY

Microphone gain mismatch and related problems can be solved by a system and method that applies an automatic microphone signal gain equalization without any direct absolute reference or calibration phase.

The present disclosure provides a system and a method in which gain factors are estimated based on the evaluation of acoustic cross-talk components that can be observed for multiple microphones in a multi-microphone system during speech activity of a passenger. As used herein, the term "cross-talk" component describes the impact of the speech signal component emitted by a speaker in a dedicated spatial zone on a distant microphone in a different spatial zone. Typically, the distant microphone shows, e.g., 6 dB lower gain (cross-talk attenuation) compared to the microphone in the speaker dedicated zone. This effect results in an acoustic "cross-talk coupling" of −6 dB. The expected cross-talk attenuation is influenced by at least one existent acoustic environment factor selected from the group consisting of: microphone position, microphone characteristic, microphone orientation, speaker position, speaker orientation, room dimension, reverberation, critical distance (distance from source where direct path sound energy and the reverberant sound energy are equal), amount of early reflections, and combinations.

The present disclosure further provides a system and a method in which gain factors can be directly calculated based on cross-talk speech components related to the existing room acoustics.

The present disclosure provides a system and method that account for specific room acoustics using target values for expected cross-talk couplings.

BRIEF DESCRIPTION OF THE DRAWINGS

The accompanying drawings illustrate aspects of the present disclosure, and together with the general description given above and the detailed description given below, explain the principles of the present disclosure. As shown throughout the drawings, like reference numerals designate like or corresponding parts.

FIG. 5A shows a first state in a car setup without microphone gain tolerances.

FIG. 5B shows a second state in a car setup with microphone gain tolerances.

DETAILED DESCRIPTION OF THE DISCLOSURE

Figure 1B:
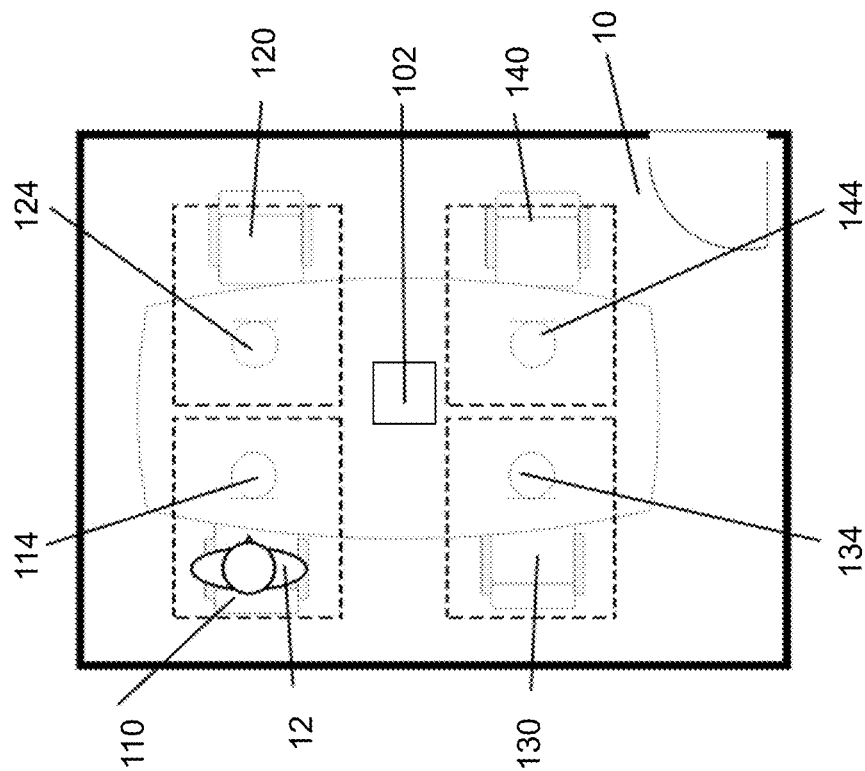
FIG. 1B shows an exemplary conference room environment for an exemplary system and method according to the present disclosure.

Referring to the drawings and, in particular, to FIGS. 1A, 1B and 2, a system for signal gain equalization is generally represented by reference numeral 100, hereinafter "system 100". System 100 is a multi-microphone system used to capture speech sound from multiple persons 12 in an example environment 10, such as a car in FIG. 1A or a conference room in FIG. 1B. Advantageously, system 100 automatically applies signal gain equalization based on evaluation of acoustic cross-talk components.

Environment 10 can include spatial zones 110, 120, 130, and 140, having microphones 114, 124, 134, and 144, respectively. Microphones 114, 124, 134, and 144 are arranged such that different spatial zones 110, 120, 130, and 140 are covered by each respective microphone. Specifically, microphones 114, 124, 134, and 144 are spatially separated so that each spatial zone is defined by the proximity to the corresponding microphone. This is also referred to as an "acoustic bubble" around the microphone. Spatial zones 110, 120, 130, and 140 are indicated by the respective dashed boundary lines. The dashed lines are for illustrative purposes only and are not intended to limit the relative sizes and/or dispositions within environment 10.

Figure 1A:
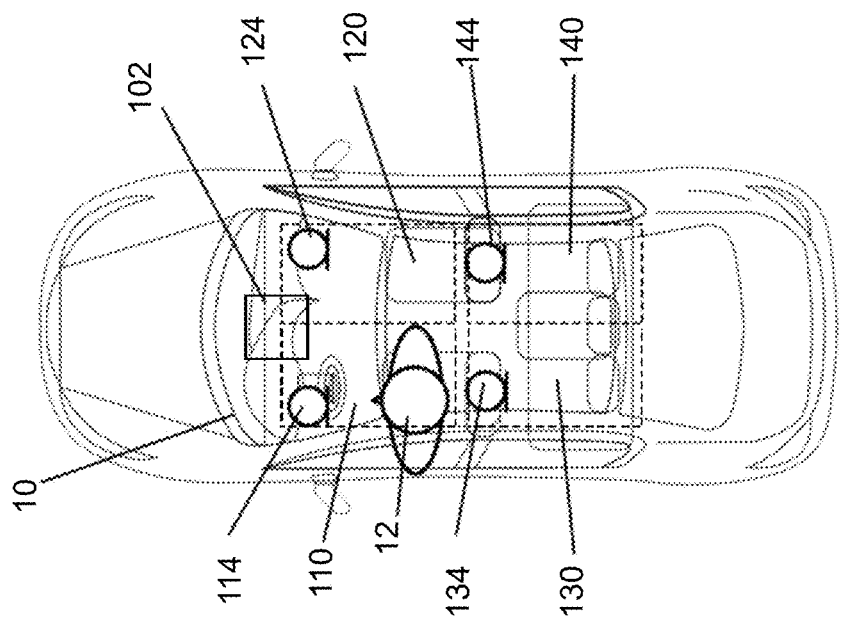
FIG. 1A shows an exemplary vehicular environment for an exemplary system and method according to the present disclosure.

In FIGS. 1A and 1B, microphone 114 is in spatial zone 110, microphone 124 is in spatial zone 120, microphone 134 is in spatial zone 130, and microphone 144 is in spatial zone 140.

Although four spatial zones are shown in environment 10, the system and method of the present disclosure is operable in an environment with at least two zones. For example, in a vehicular environment, there can be one seat-dedicated microphone 114 for zone 110 and a second seat-dedicated microphone 124 for zone 120. Such a configuration corresponds to one microphone for the driver's seat and one microphone for the front passenger's seat. In a conference room environment, each zone corresponding to a seat or participant can be equipped with at least one microphone.

Although each of spatial zones 110, 120, 130 and 140 is shown in the figures to include a single microphone, each zone can include multiple microphones or an array of microphones to focus on the related speaker in each zone. That is, although microphone 114 is shown and described as one microphone, for example, microphone 114 can be an array of microphones. Advantageously, such an arrangement allows for techniques such as beamforming. The considered gain tolerances in such cases are related to the output of the microphone array processing and describe gain tolerances of "virtual microphones". Examples in the following that indicate appropriate values for a conceivable cross-talk attenuation, comprise one microphone. For virtual microphones other values might be appropriate. A virtual microphone as used herein is understood to be a combination of multiple physical microphones in an array of microphones dedicated to a single spatial zone and the processing and determining of one output signal therefrom. Beamforming techniques to determine one output signal are examples. This output signal associated to the array of microphones and designated as the output signal of a virtual microphone, can focus on one dedicated zone similar to a single omni-directional microphone positioned close to a speaker in a particular zone, or similar to a directional microphone steered towards the desired zone or rather speaker.

It will further be understood that environments such as environment 10 can have more than four spatial zones as long as each zone has at least one microphone.

Figure 2:
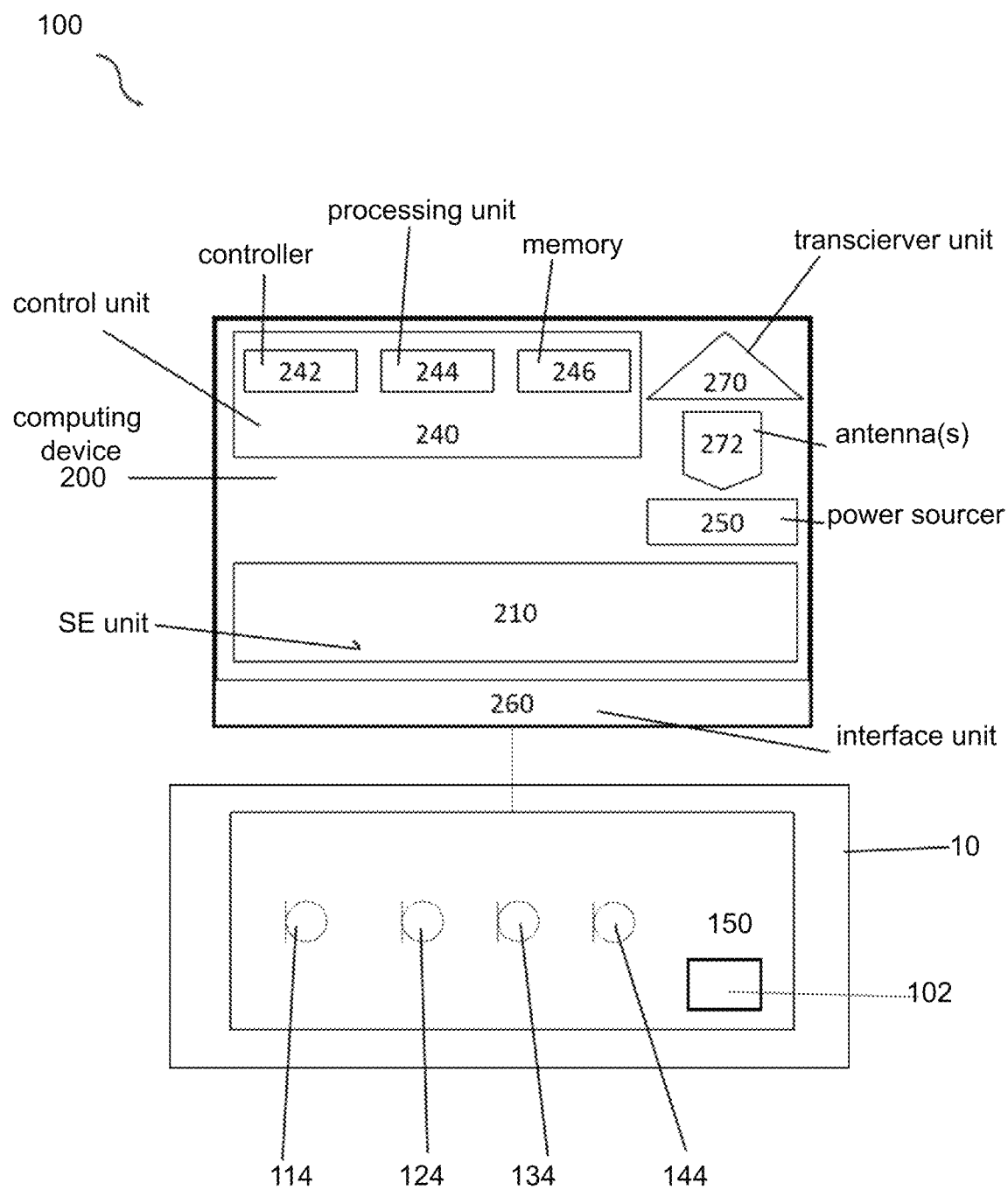
FIG. 2 shows an embodiment of the system according to the present disclosure.

Referring to FIG. 2, example components of system 100 will now be discussed.

System 100 includes the following exemplary components that are electrically and/or communicatively connected: a sound reproducer 102 (FIG. 1A, FIG. 1B); a first microphone 114; a second microphone 124; a third microphone 134; a fourth microphone 144; and a computing unit 200. Computing unit 200 can include the following: an SE unit 210; a control unit 240, which can be configured to include a controller 242, a processing unit 244 and/or a non-transitory memory 246; a power source 250 (e.g., battery or AC-DC converter); an interface unit 260, which can be configured as an interface for external power connection and/or external data connection; a transceiver unit 270 for wireless communication; and antenna(s) 272. The components of computing unit 200 can be implemented in a distributed manner.

Figure 4A:
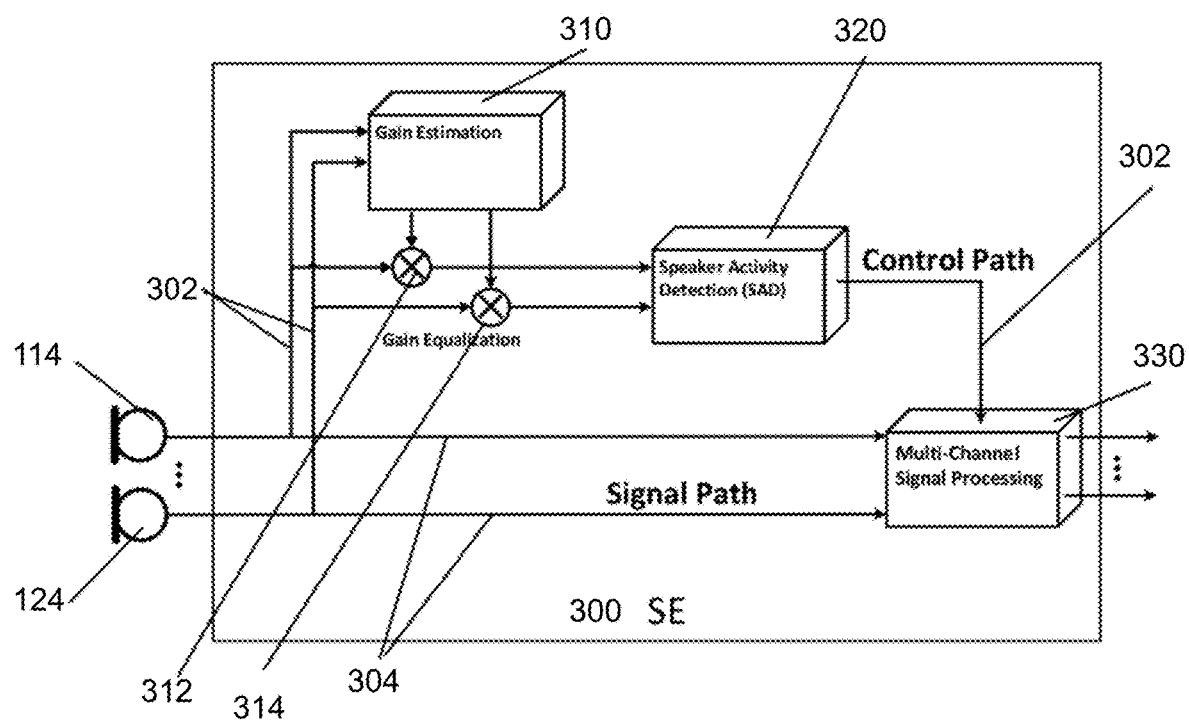
FIG. 4A shows an example embodiment of the system according to the present disclosure with gain equalization applied in the control path.
Figure 4B:
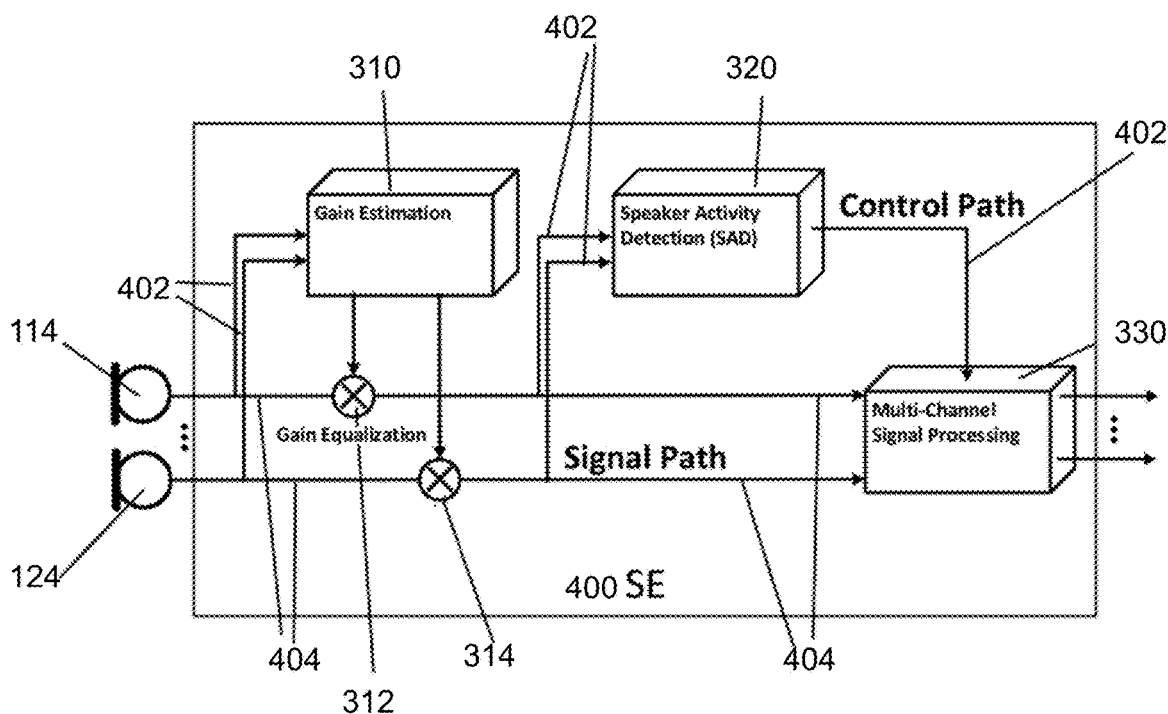
FIG. 4B shows an example embodiment of the system according to the present disclosure with gain equalization applied in the signal path.

SE unit 210 performs gain estimation and application, speaker activity detection, and multi-channel signal processing. Example embodiments of SE unit 210 are SE 300 (FIG. 4A) and SE 400 (FIG. 4B). In SE 300, gain is applied to a control path as shown in FIG. 4A. In SE 400, gain is instead applied to a signal path as shown in FIG. 4B. Both SE 300 and 400 are discussed in further detail below.

Sound reproducer 102 is an electromechanical device that produces sound, also known as a loudspeaker. The location shown for sound reproducer 102 in FIGS. 1A and 1B is for illustrative purposes only. In embodiments, there can be one or more sound reproducers 102.

Microphones 114, 124, 134, and 144 are transducers that convert sound into an electrical signal. Typically, a microphone utilizes a diaphragm that converts sound to mechanical motion that is in turn converted to an electrical signal.

Several types of microphones exist that use different techniques to convert, for example, air pressure variations of a sound wave into an electrical signal. Nonlimiting examples include: dynamic microphones that use a coil of wire suspended in a magnetic field; condenser microphones that use a vibrating diaphragm as a capacitor plate; and piezoelectric microphones that use a crystal of made of piezoelectric material. A microphone according to the present disclosure can also include a radio transmitter and receiver for wireless applications.

Microphones 114, 124, 134, and 144 can be directional microphones (e.g. cardioid microphones) so that focus on a spatial zone is emphasized. An omni-directional microphone can also focus on one zone by its position within the zone close to the desired speaker. Microphone 114 can be one or more microphones or microphone arrays. Microphones 124, 134, and 144 can also be one or more microphones or microphone arrays.

Sound reproducer 102 and microphones 114, 124, 134, and 144 can be disposed in one or more enclosures 150.

Detecting in which zone of at least two zones a person is speaking based on multiple microphone signals can be done, e.g., by evaluating the speech power occurring at a microphone in each of the at least two zones. However, control of multi-zone processing is a complex task because of, for example, room acoustics, noise, microphone tolerances, lack of defined reference signals, and low latencies. In addition, complex acoustic paths within an environment can exist. For example, in a passenger compartment of a vehicle, there can exist frequencies that will result in a higher signal level at a microphone more distant than the closest microphone. Background noises, echo noises, or other driving noises can lead to low signal-to-noise ratio (SNR). In some environments, microphone gain mismatch can occur. Tolerances for microphone sensitivity resulting in gain tolerances are often specified within +/−3 dB for a single physical microphone. Since there are no defined reference signals, explicit car-specific calibration is not possible. Gain equalization must be done during operation based on the sound produced by the person or persons speaking. Moreover, instantaneous decisions for the detection of zone activity are needed to control the real-time algorithms.

An important aspect of multi-zone processing (e.g., for separation, combination, or zone selection) is the observation of level differences of the different microphone signals. For each passenger speaking it is assumed that the passenger-dedicated microphone for the respective passenger's seat shows higher signal level compared to the microphones for the other seats. Typically, acoustic cross-talk couplings between the spatial zones in the car ("cross-talk") are at least in the range of about −6 dB (depending on the placement of the microphones, the position of the speaker and further room acoustic parameters).

When there is gain mismatch between two microphones, acoustically detecting the correct zone by evaluating the speech power is frustrated and can result in erroneous decisions. Microphone gain tolerances also can directly harm the quality of the processed output signal. For example, in a conference call, where the signals of all persons speaking and zones are to be combined, microphones with a lower gain, cause an attenuation of the dedicated speaker in the combined output signal. For further example, where the driver's microphone has a gain mismatch of −3 dB and the front passenger's microphone has a gain mismatch of +3 dB, a robust decision as to which spatial zone (e.g., spatial zone 110 or 120) to select based on evaluation of the speech powers is not always possible. At driver's speech activity, the typically expected 6 dB acoustic cross-talk attenuation in the passenger's microphone in this example is completely eliminated by the mismatch. But evaluating power ratios and detecting the active speaker zone is important especially in low SNR situations.

Figure 3:
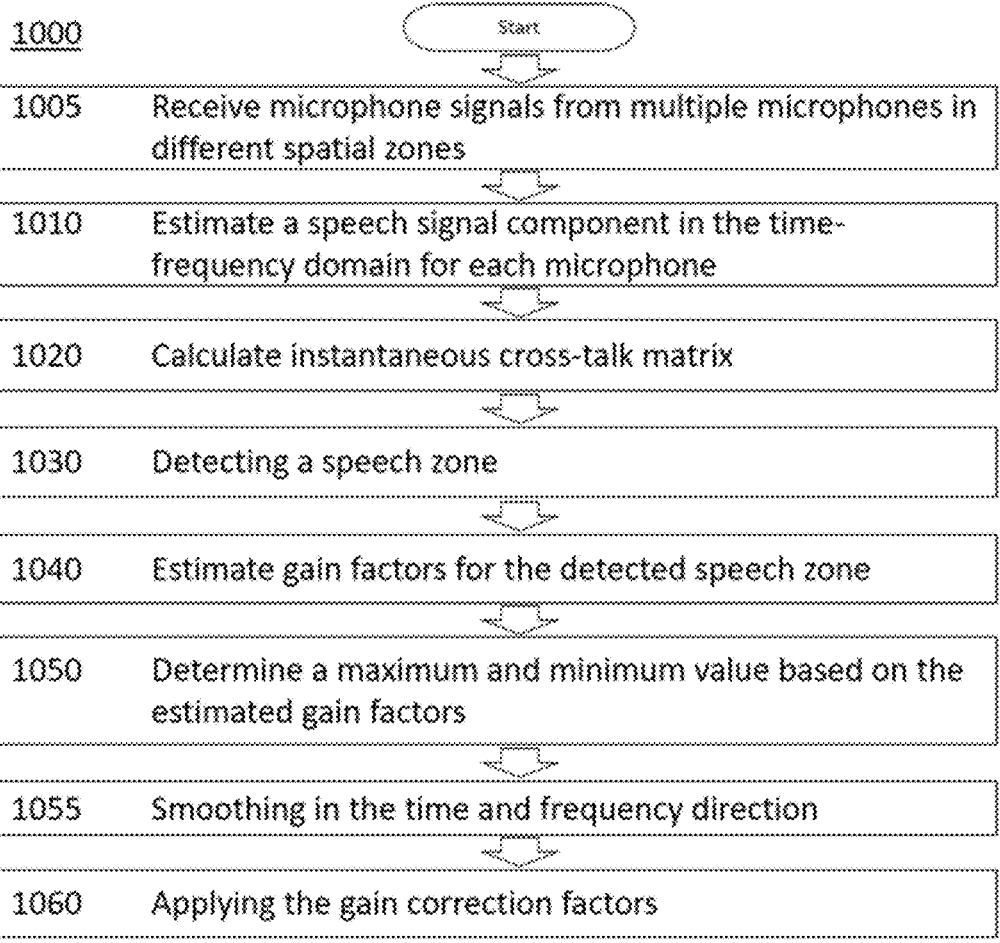
FIG. 3 is logic flow diagram of an example method according to the present disclosure.

FIG. 3 illustrate a logic flow 1000 of an example method according to the present disclosure. The functionality of logic flow 1000 can be performed by (i) a single computing entity, e.g., computing unit 200 of system 100, or (ii) in a distributed manner. In the latter case, portions of the structure and/or operations of logic flow 1000 are performed across multiple computing platforms and/or entities using a distributed system architecture, e.g., a master-slave architecture, a client-server architecture, a peer-to-peer architecture, a shared database architecture, and the like. The embodiments are not limited in this context.

The following example method based on logic 1000 is processed in the discrete Fourier transform domain (or sub-band domain) where the frame index is indicated by l and the frequency subband index by k. The signals of the available M microphones in the time domain are segmented by a Hann window with a frame length K. The indices m, m'∈ $\mathcal{M}$ ={1, . . . , M} denote the particular microphones. Although in this example, the term "microphone" is described as a single physical microphone, it will be understood that a microphone can also be a speaker dedicated virtual microphones where an array of microphones is dedicated to each speaker. Thus, gain equalization can be achieved for "virtual microphones" corresponding to the output signal of a beamformer. Output signals generated by this array processing, for example, by beamforming, can be compared for differences in gain.

At step 1005, microphone signals from multiple microphones in different spatial zones are received.

At step 1010, a speech signal component in the time-frequency domain is estimated for each microphone. In one example, this can be done by spectral subtraction of the noise component from each microphone signal. The overall speech signal component occurring in one microphone m is estimated. This component includes direct desired speech components but can also include cross-talk components of active, interfering, and/or distant speakers.

Smoothed power spectral density estimates $\hat{\phi}_{YY,m}(l, k)$ occurring for all available microphones are computed with the smoothing constant α by $$\hat{\phi}_{YY,m}(l,k) \alpha \cdot \hat{\phi}_{YY,m}(l-1,k) + \cdot |Y_m(l,k)|^2, \quad \text{Equation (1)}$$

where $Y_m(l, k)$ is the related microphone signal spectrum in the subband domain. Using the noise estimate $\hat{\phi}_{NN,m}(l, k)$ and assuming that speech and noise components are uncorrelated and that the microphone signal spectra are a superposition of speech and noise components, the $\hat{\phi}_{SS,m}(l, k)$ in channel m can be determined by $$\hat{\phi}_{SS,m}(l,k) = \hat{\phi}_{YY,m}(l,k) - \hat{\phi}_{NN,m}(l,k). \quad \text{Equation (2)}$$

At step 1020, an instantaneous acoustic cross-talk coupling matrix is calculated.

In one example, this can be done based upon the logarithmic speech signal component. Specifically, a logarithmic spectral M×M acoustic cross-talk coupling matrix is calculated by subtracting the logarithmic speech component occurring in the currently-observed, speaker-dedicated microphone 114, from the logarithmic speech component occurring in each of the distant microphones 124, 134, and 144. In an example the logarithmic acoustic cross-talk coupling matrix can be transformed to the linear domain. Alternatively, further calculations can be performed in the logarithmic domain.

In another example, based on the speech signal power spectral density estimate, an instantaneous spectral M×M acoustic cross-talk coupling matrix C(l, k) is determined by calculating the ratio between the speech component occurring in each of the distant microphones m' and the speech component occurring in the currently observed speaker-dedicated microphone m. A particular entry for a cross-talk coupling between the microphones m and m' in this matrix is formulated by $$C_{m,m'}(\ell, k) = \frac{\hat{\phi}_{SS,m'}(\ell, k)}{\hat{\phi}_{SS,m}(\ell, k)}, \quad \text{Equation (3)}$$

and the whole matrix can be written as $$C(\ell, k) = \begin{pmatrix} C_{1,1}(\ell, k) & C_{1,2}(\ell, k) & \ldots & C_{1,M}(\ell, k) \\ C_{2,1}(\ell, k) & C_{2,2}(\ell, k) & \ldots & C_{2,M}(\ell, k) \\ \vdots & \vdots & \ddots & \vdots \\ C_{M,1}(\ell, k) & C_{M,2}(\ell, k) & \ldots & C_{M,M}(\ell, k) \end{pmatrix}. \quad \text{Equation (4)}$$

Thus, for each of M microphones M−1 cross-talk coupling matrix elements are computed. It should be appreciated by those skilled in the art that the values on the main diagonal of the matrix are not relevant because they are always 1.

For each time-frequency bin, a cross-talk coupling value for a pair of microphones is calculated, for example, a cross-talk coupling between microphone 114 and 124 corresponding to spatial zones 110 and 120, a cross-talk coupling between microphone 114 and 134 corresponding to spatial zones 110 and 130, and/or a cross-talk coupling between microphone 114 and 144 corresponding to spatial zones 110 and 140. See FIGS. 5A and 5B. In these figures the occurring acoustic cross-talk coupling is symbolized by a Δ, corresponding to an estimated cross-talk coupling $C_{m,m}(1,k)$.

At step 1030, a trigger is used to detect a speech zone. Exemplary non-limiting triggers include a Coherence-to-Diffuse-Ratio that indicates proximity of the microphone to the speaker, relative time delays between microphones, a Signal-to-Noise-Ratio smoothed over time, zone activity detection based on voice biometrics, or visual information provided by a camera or another sensor (not shown) configured to provide information regarding the spatial zone position of an active speaker.

In embodiments where an algorithm related to the camera extracts activity information of the zone dedicated speaker based on visual information, only a camera can be used for the trigger.

At step 1040, gain factors for the detected speech zone are estimated by evaluating the values in the row of the cross-talk coupling matrix related to the index of the detected zone. For example, if the m-th zone with m=2 is detected sometimes by the trigger mechanism, the second row of the cross-talk coupling matrix is evaluated and used to determine the cross-talk coupling occurring in the other microphones. Gain factors can be calculated with an instantaneous trigger (also referred to as a "ground truth") that indicates activity of a specific spatial zone. As indicated above, exemplary non-limiting triggers include a coherence-to-diffuse-ratio that indicates proximity of the microphone to the speaker, relative time delays between microphones, or an SNR smoothed over time. In certain embodiments, ground truths can also use external information, such as voice biometrics, visual information from a camera, or combinations thereof. In certain embodiments, an instantaneous trigger can incorporate power ratios in combination with one or more of the aforementioned factors used as instantaneous triggers. In certain embodiments, power ratios are not considered. In example embodiments where the triggers are not based on power or power ratios, e.g., a low SNR scenario, it can be advantageous to combine several trigger factors for more optimal detection.

When the system has not yet adapted to the environment, more time context can be exploited to detect the activity of persons speaking and to start the adaptation of the gain factors. For the trigger $T_m(l)$ follows:

$$T_m(\ell) = \begin{cases} 1, & \text{if activity is detected by some trigger algorithm for speaker } m, \\ 0, & \text{else,} \end{cases} \quad \text{Equation (5)}$$

If the instantaneous trigger indicates that a zone m shows speaker activity, a gain correction factor $\tilde{G}_{m,m}(l, k)$ for zone m can be estimated by evaluating the specific value in the m-th row of the cross-talk coupling matrix $C(l, k)$ from Equation (4). For each time frame l and frequency bin k, the value of the preliminary gain factor $\tilde{G}_{m,m}(l, k)$ related to the relevant cross-talk coupling matrix entry $C_{m,m}(l, k)$ (Equation (3)) is calculated by $$\tilde{G}_{m,m'}(\ell, k) = \begin{cases} \dfrac{D_{m,m'}(\ell, k)}{C_{m,m'}(\ell, k)}, & \text{if } T_m(\ell) = 1, \\ 0, & \text{else.} \end{cases} \quad \text{Equation (6)}$$

The deviation of the observed cross-talk from the expected cross-talk related to the room acoustics is included by $D_{m,m'}$, (l, k). The expectation is to apply a gain if the observed cross-talk coupling $C_{m,m}(l, k)$ is below a minimum $D_{min}$ or above a maximum cross-talk $D_{max}$ coupling. Otherwise nothing should be done. Therefore, for $D_{m,m}(l, k)$:

$$D_{m,m'}(\ell, k) = \begin{cases} D_{min}, & \text{if } C_{m,m'}(\ell, k) < D_{min}, \\ D_{max}, & \text{if } C_{m,m'}(\ell, k) > D_{max}, \\ 0, & \text{else.} \end{cases} \quad \text{Equation (7)}$$

By way of example, in a car, $D_{min}$=4 ($\approx$6 dB) and $D_{max}$=40 ($\approx$16 dB) can be reasonable values to take the specific acoustic environment into account. Applying Equation (6) for m'=m results in M−1 values representing the deviations of the cross-talk coupling from the expected range that is given by the minimum and maximum cross-talk values. If the observed cross-talk coupling is outside this range an adequate gain correction factor has to be estimated to bring the cross-talk coupling back into the range. Referring to Equation (7), the value 0 as the gain factor in the else path is only a preliminary result due to the maximum operation in Equation (8).

An example scenario involves the observed cross-talk being too low due to disadvantageous microphone gain tolerances, so that a discrimination of the activities of different microphones dedicated to different speakers is not robust anymore. Because only one gain factor can be applied for each channel m, one dimension of the particular gain factors $\tilde{G}_{m,m'}(l, k)$ should be reduced. Thus, a maximum across all microphone-pair-related gain factors, necessary to compensate for a too-low or too-high cross-talk component, is determined for the considered microphone m:

$$\tilde{G}_m(\ell, k) = \begin{cases} \max_{\substack{m' \in M \\ m' \neq m}} \{\tilde{G}_{m,m'}(\ell, k)\}, & \text{if } I(\ell, k) > 0, \\ & \text{for speaker } m. \\ 1, & \text{else.} \end{cases} \quad \text{Equation (8)}$$

with the indicator function $$I(\ell, k) = \sum_{\substack{m' \in M \\ m' \neq m}} \tilde{G}_{m,m'}(\ell, k), \quad \text{Equation (9)}$$

indicating by the result 0 that no gain measure could be calculated by Equation (6) and Equation (7). Because 0 is not allowed as an appropriate gain factor, if all temporary gain results are 0, a neutral value 1 is set for the searched gain factor.

At step 1050, the values of the estimated gain correction factors are limited to a range between a minimum and maximum value.

After the maximum across all microphone pair related gain correction factors is determined, only one gain factor is remaining for each microphone. The values of the estimated gain correction factors can thus be limited to a minimum gain $-g_{max}$ and a maximum gain value $g_{max}$ by $$G_m(l,k) = \max\{\min\{\tilde{G}_m(l,k), g_{max}\}, -g_{max}\}, \quad \text{Equation (10)}$$

with, e.g., $g_{max}$=10 (=10 dB).

Optionally at step 1055, a smoothing across time and across frequency is performed to ensure that the room acoustics and relation between gains of the microphones are properly indicated by the estimated gain correction factors.

A smoothing across time and across frequency ensures that the room acoustics and the relation between the gains of the microphones are indicated by the estimated gain correction factors. With the smoothing constant $\beta_t$, a long term version $\overline{G}_m(l, k)$ of the gain correction factors can be realized by smoothing over time if the trigger $T_m(l)$ indicates activity of the m-th speaker:

$$\overline{G}_m(\ell, k) = \begin{cases} \beta_t \cdot \overline{G}_m(\ell - 1, k) + & \text{if } T_m(\ell, k) = 1, \\ (1 - \beta_t) \cdot G_m(\ell, k), & \\ \overline{G}_m(\ell - 1, k), & \text{else.} \end{cases} \quad \text{Equation (11)}$$

Additional smoothing across the frequency subbands can occur. For example, by using a normalized window function w(i) (e.g., Hann window), this smoothing can be formulated by $$\bar{\bar{G}}_m(\ell, k) = \sum_{i=-K/2}^{K/2} w(i) \cdot \bar{G}_m(\ell, k - i). \quad \text{Equation (12)}$$

At step 1060 the gain correction factors are applied to the speech signal component in a control path (FIG. 4A) or a signal path (FIG. 4B).

The estimated time and frequency smoothed frequency dependent gain correction factors $\bar{\bar{G}}_m(l, k)$ are then applied to the speech signal component, thereby resulting in signal equalization of the audio signal directed to the control path for controlling further SE and/or resulting in signal equalization in the output audio signal routed through the signal path.

Referring to FIG. 4A, signals from microphones 114 and 124 are received by SE 300. Each signal is fed into a control path 302 and a signal path 304. Gain estimation is performed at gain estimation block 310. The two outputs of the gain estimation block 310 are subjected to gain equalization at blocks 312 and 314. The equalized signals are fed into speaker activity detection (SAD) 320. The output signal from SAD 320 and the signal from signal path 304 are fed into multi-channel signal processing block 330 for signal processing (e.g., as described above) and outputting, (e.g., from one or more of sound reproducer 112, 122, 132, 142).

Referring to FIG. 4B, signals from microphones 114 and 124 are received by SE 400. Each signal is fed into a control path 402 and a signal path 404. Gain estimation is performed at gain estimation block 310. The two outputs from the gain estimation block 310 are fed into gain equalization blocks 312 and 314, respectively, in signal path 404. Thereafter, the output signals of the gain equalization are fed into SAD 320 and multi-channel signal processing block 330. The output signal from SAD 320 and the signals from signal path 404 are fed into multi-channel signal processing block 330 for signal processing (e.g., as described above) and outputting, (e.g., from one or more of sound reproducers 112, 122, 132, 142).

Applying equalization in the signal path can result in a smoother combination of the different speaker-dedicated signals without noticeable gain differences during speaker changes. As such, the system not only compensates for microphone gain tolerances but also for persons speaking with a different volume level or where a lower speech level in the microphones is caused by larger distance between microphone and speaker.

FIG. 5A illustrates a usual setup where no gain equalization according to the present disclosure is necessary, for example, a setup without additional microphone gain tolerances outside an expected range. The cross-talk coupling is in an expected range (always negative for the distant microphones).

FIG. 5B illustrates a setup where microphone gain tolerances occur. The first microphone shows an additional gain of −7 dB resulting in a not acoustically expected cross-talk coupling (especially between the first and second microphone showing a positive cross-coupling with 1 dB). In this example, microphone 114 is at −3 dB, microphone 124 is at −3 dB, microphone 134 is at −11 dB, and microphone 144 is at −13 dB without any tolerances. Including the tolerance in microphone 1, microphone 1 effectively indicates a level of −10 dB instead of −3 dB. Related to the resulting worst cross-coupling of 1 dB, system 100 automatically adjusts the gain on microphone 114 to by +7 dB in order to get a cross-talk coupling in the expected range.

SE according to the present disclosure has multiple applications, e.g., in seat-specific dialogs where SE needs to acoustically separate signals from different acoustic zones to provide one or more output signals for automatic speech recognition purposes; conference calls where SE needs to combine acoustic zones to a single output signal for a phone call; zone selection where SE needs to detect from which zone in the car, a speech activity is coming from; and meeting transcriptions where it is necessary to detect and to document who spoke at which time during a meeting or a conversation.

It should be understood that elements or functions of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

When a certain structural element is described as "is connected to", "is coupled to", or "is in contact with" a second structural element, it should be interpreted that the second structural element can "be connected to", "be coupled to", or "be in contact with" another structural element, as well as that the certain structural element is directly connected to or is in direct contact with yet another structural element.

It should be noted that the terms "first", "second", and the like can be used herein to modify various elements. These modifiers do not imply a spatial, sequential or hierarchical order to the modified elements unless specifically stated.

As used herein, the terms "a" and "an" mean "one or more" unless specifically indicated otherwise.

As used herein, the term "substantially" means the complete or nearly complete extent or degree of an action, characteristic, property, state, structure, item, or result. For example, an object that is "substantially" enclosed means that the object is either completely enclosed or nearly completely enclosed. The exact allowable degree of deviation from absolute completeness can in some cases depend on the specific context. However, generally, the nearness of completion will be to have the same overall result as if absolute and total completion were obtained.

As used herein, the term "about" is used to provide flexibility to a numerical range endpoint by providing that a given value can be "a little above" or "a little below" the endpoint. Further, where a numerical range is provided, the range is intended to include any and all numbers within the numerical range, including the end points of the range.

While the present disclosure has been described with reference to one or more exemplary embodiments, it will be understood by those skilled in the art, that various changes can be made, and equivalents can be substituted for elements thereof without departing from the scope of the present disclosure. In addition, many modifications can be made to adapt a particular situation or material to the teachings of the present disclosure without departing from the scope thereof. Therefore, it is intended that the present disclosure will not be limited to the particular embodiments disclosed herein, but that the disclosure will include all aspects falling within the scope of a fair reading of appended claims.

The invention claimed is:

1. A computer-implemented method comprising:
   receiving, by a computing device, at least one signal from each microphone of a plurality of microphones, wherein each microphone is associated with a respective spatial zone, and wherein the at least one signal comprises a speech signal component from a speaker in the respective spatial zone;

determining the speech signal component in the time-frequency domain for the at least one signal from each microphone;

calculating instantaneous cross-talk couplings based on each speech signal component;

estimating gain factors based on the calculated cross-talk couplings and a given expected cross-talk attenuation to yield estimated gain factors;

limiting the estimated gain factors to a range between a maximum value and a minimum value to yield final gain factors; and applying the final gain factors to the the at least one signal from each microphone.

2. The method of claim 1, wherein the final gain factors are applied to a control path.

3. The method of claim 1, wherein the final gain factors are applied to a signal path.

4. The method of claim 1, further comprising: detecting a spatial zone corresponding to an active speaker, wherein the spatial zone is detected using a trigger.

5. The method of claim 4, wherein the trigger is at least one trigger selected from the group consisting of: Coherence-to-Diffuse-Ratio that indicates proximity of the microphone to the speaker, relative time delays between microphones, a Signal-to-Noise-Ratio smoothed over time, zone activity indicated by voice biometrics, and visual information provided by a camera.

6. The method of claim 1, wherein each microphone is an array of microphones associated with a different spatial zone.

7. The method of claim 1, wherein the expected cross-talk attenuation is defined by at least one existent acoustic environment factor selected from the group consisting of: microphone position, speaker position, dimension, reverberation, and combinations.

8. A computer program product residing on a non-transitory computer readable storage medium having a plurality of instructions stored thereon which, when executed across one or more processors, causes at least a portion of the one or more processors to perform operations comprising:

receiving, by a computing device, at least one signal from each microphone of a plurality of microphones, wherein each microphone is associated with a respective spatial zone, and wherein the at least one signal comprises a speech signal component from a speaker in the respective spatial zone;

determining the speech signal component in the time-frequency domain for the at least one signal from each microphone;

calculating instantaneous cross-talk couplings based on each speech signal component;

estimating gain factors based on the calculated cross-talk couplings and a given expected cross-talk attenuation to yield estimated gain factors;

limiting the estimated gain factors to a range between a maximum value and a minimum value to yield final gain factors; and applying the final gain factors to the the at least one signal from each microphone.

9. The computer program product of claim 8, wherein the final gain factors are applied to a control path.

10. The computer program product of claim 8, wherein the final gain factors are applied to a signal path.

11. The computer program product of claim 8, further comprising: detecting a spatial zone corresponding to an active speaker, wherein the spatial zone is detected using a trigger.

12. The computer program product of claim 11, wherein the trigger is at least one trigger selected from the group consisting of: Coherence-to-Diffuse-Ratio that indicates proximity of the microphone to the speaker, relative time delays between microphones, a Signal-to-Noise-Ratio smoothed over time, zone activity indicated by voice biometrics, and visual information provided by a camera.

13. The computer program product of claim 8, wherein each microphone is an array of microphones associated with a different spatial zone.

14. The computer program product of claim 8, wherein the expected cross-talk attenuation is defined by at least one existent acoustic environment factor selected from the group consisting of: microphone position, speaker position, dimension, reverberation, and combinations.

15. A computing system including one or more processors and one or more non-transitory memories storing program instructions that, when executed, perform operations comprising:

receiving, by a computing device, at least one signal from each microphone of a plurality of microphones, wherein each microphone is associated with a respective spatial zone, and wherein the at least one signal comprises a speech signal component from a speaker in the respective spatial zone;

determining the speech signal component in the time-frequency domain for each at least one signal;

calculating instantaneous cross-talk couplings based on each speech signal component;

estimating gain factors based on the calculated cross-talk couplings and a given expected cross-talk attenuation to yield estimated gain factors;

limiting the estimated gain factors to a range between a maximum value and a minimum value to yield final gain factors; and applying the final gain factors to the the at least one signal from each microphone.

16. The computing system of claim 15, wherein the final gain factors are applied to a control path.

17. The computing system of claim 15, wherein the final gain factors are applied to a signal path.

18. The computing system of claim 15, further comprising: detecting a spatial zone corresponding to an active speaker, wherein the spatial zone is detected using a trigger.

19. The computing system of claim 18, wherein the trigger is at least one trigger selected from the group consisting of: Coherence-to-Diffuse-Ratio that indicates proximity of the microphone to the speaker, relative time delays between microphones, a Signal-to-Noise-Ratio smoothed over time, zone activity indicated by voice biometrics, and visual information provided by a camera.

20. The computing system of claim 15, wherein each microphone is an array of microphones associated with a different spatial zone.

21. The computing system of claim 15, wherein the expected cross-talk attenuation is defined by at least one existent acoustic environment factor selected from the group consisting of: microphone position, speaker position, dimension, reverberation, and combinations.

* * * * *